United States Patent
Hattori et al.

(10) Patent No.: US 11,306,178 B2
(45) Date of Patent: Apr. 19, 2022

(54) EPOXY RESIN COMPOSITION AND CURED PRODUCT

(71) Applicant: NIPPON STEEL CHEMICAL & MATERIAL CO., LTD., Tokyo (JP)

(72) Inventors: Koichi Hattori, Tokyo (JP); Naoki Yokoyama, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 24 days.

(21) Appl. No.: 17/042,629

(22) PCT Filed: Mar. 15, 2019

(86) PCT No.: PCT/JP2019/010781
§ 371 (c)(1),
(2) Date: Sep. 28, 2020

(87) PCT Pub. No.: WO2019/188400
PCT Pub. Date: Oct. 3, 2019

(65) Prior Publication Data
US 2021/0032400 A1    Feb. 4, 2021

(30) Foreign Application Priority Data
Mar. 30, 2018    (JP) .............................. JP2018-069706

(51) Int. Cl.
C08G 59/14    (2006.01)
C08G 59/06    (2006.01)
C08G 59/44    (2006.01)

(52) U.S. Cl.
CPC ......... *C08G 59/1477* (2013.01); *C08G 59/06* (2013.01); *C08G 59/44* (2013.01); *C08L 2205/025* (2013.01); *C08L 2205/03* (2013.01)

(58) Field of Classification Search
CPC ................................................ C08G 59/1477
See application file for complete search history.

(56) References Cited

U.S. PATENT DOCUMENTS

| | | | |
|---|---|---|---|
| 4,576,726 A * | 3/1986 | Watanabe | C08G 18/58 252/62.54 |
| 10,266,637 B2 * | 4/2019 | Yamada | C08G 18/12 |
| 2016/0272750 A1 | 9/2016 | Voci et al. | |
| 2017/0198085 A1 | 7/2017 | Yamada et al. | |
| 2018/0163104 A1 * | 6/2018 | Lutz | C08G 18/3215 |
| 2021/0047458 A1 * | 2/2021 | Yokoyama | C08G 59/1477 |

FOREIGN PATENT DOCUMENTS

| | | |
|---|---|---|
| JP | H04-145185 A | 5/1992 |
| JP | H05-214061 A | 8/1993 |
| JP | H06-206980 A | 7/1994 |
| JP | H08-20706 A | 1/1996 |
| JP | 2007-224144 A | 9/2007 |
| JP | 2007-284467 A | 11/2007 |
| JP | 2007-284474 A | 11/2007 |
| JP | 2015-537081 A | 12/2015 |
| JP | 2016-011409 A | 1/2016 |

OTHER PUBLICATIONS

International Search Report dated Jun. 4, 2019, issued for PCT/JP2019/010781.
Translation of International Preliminary Report on Patentability (Chapter II of the Patent Cooperation Treaty) for PCT/JP2019/010781, dated Aug. 4, 2020.

* cited by examiner

*Primary Examiner* — Megan McCulley
(74) *Attorney, Agent, or Firm* — Locke Lord LLP

(57) ABSTRACT

Provided is a polyurethane-modified epoxy resin composition having satisfactory operability of processing, such as casting or impregnation, in a composition state. The epoxy resin composition includes, as essential components, the following components (A) to (D): (A) a low-concentration polyurethane-modified epoxy resin containing a polyurethane having an epoxy resin added to each of both terminals thereof and/or one terminal thereof; (B) a polyurethane-unmodified epoxy resin that is liquid at 30° C.; (C) a solid epoxy resin having a bisphenol structure, the resin having a glass transition temperature or a melting point of 50° C. or more; and (D) an amine-based curing agent that is dicyandiamide or a derivative thereof, wherein the epoxy resin composition includes the component (A) at from 3.0 wt % to 30.0 wt %, and the component (C) at from 0.1 wt % to 40.0 wt % with respect to the total of the components (A) to (D).

12 Claims, No Drawings

EPOXY RESIN COMPOSITION AND CURED PRODUCT

TECHNICAL FIELD

The present invention relates to a polyurethane-modified epoxy resin composition obtained by blending a polyurethane-modified epoxy resin with a polyurethane-unmodified epoxy resin for adjusting a polyurethane concentration, and a curing agent, and a cured product thereof.

BACKGROUND ART

An epoxy resin is excellent in processability, and various cured product characteristics, such as high heat resistance, high insulation reliability, high rigidity, a high adhesive property, and high corrosion resistance, are brought out of the resin. Accordingly, the resin has been used in a large amount in various applications, such as an electrical insulating material (casting, impregnation, a laminated plate, or a sealing material), a matrix resin for a composite material like a CFRP, a structural adhesive, and a heavy duty coating.

In contrast, an epoxy resin cured product has a low rupture elongation property, low fracture toughness, and low peel strength. Accordingly, in the application of a matrix resin for a composite material and the application of a structural adhesive where those characteristics are required, the characteristics have been improved by various kinds of modification, such as rubber modification and polyurethane modification.

In each of Patent Literature 1 and Patent Literature 2, there is a disclosure that an epoxy resin composition obtained as described below has high shear strength, high peel strength, and high torsional shear strength, and is excellent in adhesive property and impact resistance, and is hence suitable fora structural adhesive for an automobile. In a bisphenol A-type epoxy resin containing a hydroxyl group, a polypropylene diol and isophorone diisocyanate are blended so that the molar ratio "NCO/OH" of NCO groups in isophorone diisocyanate to the total of the OH groups of the bisphenol A-type epoxy resin and the polypropylene diol is 1.0. A polyurethane-modified epoxy resin thus synthesized is blended with a specific epoxy resin, such as a polyoxyalkylene diglycidyl ether, to provide the composition.

However, in each of the literatures, there is no description that resin characteristics and cured product characteristics are controlled by specifying the loading concentration of the epoxy resin containing a hydroxyl group at the time of the synthesis of the polyurethane-modified epoxy resin. In addition, in each of the literatures, there is no disclosure of data on the viscosity of the composition, and the rupture elongation, fracture toughness, and glass transition temperature of a cured product thereof.

In Patent Literature 3, there is a disclosure that a resin composition containing a urethane-modified epoxy resin obtained as described below serves as a cured product which has a high fracture toughness value and is useful in electrical and electronic applications, and building material applications. In a bisphenol A-type epoxy resin, a specific diol compound and diphenylmethane diisocyanate are loaded and caused to react with each other to provide a urethane prepolymer. After that, 1,4-butanediol serving as a chain extender is loaded to polyurethanate the prepolymer.

However, also in the literature, there is no description that resin characteristics and cured product characteristics are controlled by specifying the loading concentration of the epoxy resin containing a hydroxyl group at the time of the synthesis of the urethane-modified epoxy resin. In addition, in the literature, there is no disclosure of data on the viscosity of the composition and the rupture elongation of a cured product thereof. In the literature, there is a description of data on the fracture toughness and glass transition temperature of the cured product, and a significant improving effect on the former is observed. However, the latter is low for an epoxy resin cured product and hence heat resistance is not sufficient.

In addition, the inventors of the present invention have disclosed a urethane-modified epoxy resin in Patent Literature 4. However, the urethane-modified epoxy resin has involved a problem in that in its composition, a certain kind of curing agent shows no sufficient improvement in impact resistance.

CITATION LIST

Patent Literature

[PTL 1] JP 2007-284467 A
[PTL 2] JP 2007-284474 A
[PTL 3] JP 2007-224144 A
[PTL 4] JP 2016-11409 A

SUMMARY OF INVENTION

The present invention is directed to provide such a novel polyurethane-modified epoxy resin composition that the glass transition temperature of a cured product of the composition and the Izod impact strength value (unnotched) thereof measured in accordance with JIS K 7110 can be set to 110° C. or more and 30 kJ/m$^2$ or more, respectively for improving the fatigue resistance, peel strength, impact resistance, and tackiness of each of a casting material, a composite material, and a structural adhesive, and for retaining the heat resistance of the cured product, and a cured product thereof.

According to one embodiment of the present invention, there is provided an epoxy resin composition, including, as essential components, the following components (A) to (D):

(A) a low-concentration polyurethane-modified epoxy resin containing a polyurethane having an epoxy resin added to each of both terminals thereof and/or one terminal thereof;

(B) a polyurethane-unmodified epoxy resin that is liquid at 30° C.;

(C) a solid epoxy resin having a bisphenol structure, the resin having a glass transition temperature or a melting point of 50° C. or more; and (D) an amine-based curing agent that is dicyandiamide or a derivative thereof, wherein the epoxy resin composition includes the component (A) at from 3.0 wt % to 30.0 wt %, and the component (C) at from 0.1 wt % to 40.0 wt % with respect to a total of the components (A) to (D).

It is preferred that in the component (A), a weight concentration of polyurethane constituent components be from 1.0 wt % to 15.0 wt %. In this case, the polyurethane constituent components are a polyol compound (b), a polyisocyanate compound (c), and a low molecular weight polyol compound (d), and the weight concentration of the polyurethane constituent components refers to the total weight concentration of the constituent components.

It is preferred that the composition have an initial viscosity (40° C.) of from 100 Pa·s to 2,000 Pa·s.

It is preferred that in the epoxy resin composition, the component (A) be a low-concentration polyurethane-modified epoxy resin, which is obtained by modifying a bisphenol-based epoxy resin (a) represented by the following formula (1) having an epoxy equivalent of from 150 g/eq to 200 g/eq and a hydroxyl equivalent of from 2,000 g/eq to 2,600 g/eq with a medium to high molecular weight polyol compound (b) having a number-average molecular weight of 200 or more, a polyisocyanate compound (c), and a low molecular weight polyol compound (d) having a number-average molecular weight of less than 200 serving as a chain extender, the low-concentration polyurethane-modified epoxy resin including a polyurethane having the epoxy resin (a) added to each of both terminals thereof and/or one terminal thereof, the polyurethane being obtained by:

producing a urethane prepolymer (P) by using the epoxy resin (a) in an amount of from 78 wt % to 92 wt % with respect to a total amount of the components (a), (b), (c), and (d), and causing the medium to high molecular weight polyol compound (b) and the polyisocyanate compound (c) to react with each other in the presence of the epoxy resin (a) while using the compounds in such amounts that a molar ratio between OH groups of the component (b) and NCO groups of the component (c) falls within a range of from 1:3 to 1:20; and then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) falls within a range of from 0.9:1 to 1:0.9.

not impaired. In addition, a change in viscosity of the resin composition with time is small. That is, a resin composition excellent in storage stability can be prepared. Further, both of the bending strain and impact strength of a cured product of the composition can be improved, and a reduction in glass transition temperature thereof can be suppressed. Accordingly, the resin composition and the cured product are suitable for, for example, adhesives, coating materials, electrical and electronic materials, and matrix resins for composite materials.

DESCRIPTION OF EMBODIMENTS

An epoxy resin composition of the present invention includes, as essential components: (A) a low-concentration polyurethane-modified epoxy resin containing a polyurethane having an epoxy resin added to each of both terminals thereof and/or one terminal thereof; (B) a polyurethane-unmodified epoxy resin that is liquid at 30° C.; (C) a solid epoxy resin having a bisphenol structure, the resin having a glass transition temperature or a melting point of 50° C. or more; and (D) an amine-based curing agent that is dicyandiamide or a derivative thereof. The respective components are also referred to as "low-concentration polyurethane-modified epoxy resin (A)", "unmodified liquid epoxy resin (B)", "unmodified solid epoxy resin (C)", and "amine-based curing agent (D)", or "component (A)", "component (B)", "component (C)", and "component (D)", respectively. The respective components are described below.

In the epoxy resin composition of the present invention, the component (A) is the low-concentration polyurethane-modified epoxy resin (A). The term "low-concentration" means that a polyurethane modification ratio with respect to the epoxy resin is low, and a low-concentration polyurethane-modified epoxy resin in which the weight concentration of polyurethane constituent components is from 1.0 wt % to 15.0 wt % is suitable. The weight concentration is preferably from 1.0 wt % to 10.0 wt %, more preferably from 1.0 wt % to 7.0 wt %.

The epoxy resin composition of the present invention suitably has an initial viscosity (40° C.) of from 100 Pa·s to 2,000 Pa·s. The initial viscosity is preferably from 800 Pa·s to 1,600 Pa·s, more preferably from 1,100 Pa·s to 1,500 Pa·s.

The present invention is an epoxy resin cured product, which is obtained by curing the above-mentioned epoxy resin composition.

The epoxy resin cured product of the present invention can have a glass transition temperature (Tg) of 110° C. or more, and an Izod impact value (unnotched) of 30 kJ/m² or more measured in accordance with JIS K 7110.

The viscosity of the epoxy resin composition of the present invention before its curing can be suppressed to a range where the processability of the resin composition is

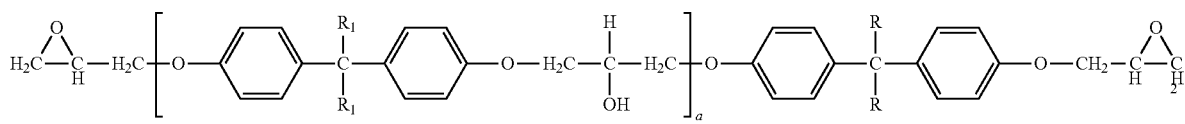

(1)

The low-concentration polyurethane-modified epoxy resin (A) may be produced by causing a medium to high molecular weight polyol compound (b), a polyisocyanate compound (c), and a low molecular weight polyol compound (d) to react with one another together with the epoxy resin (a), the components serving as raw materials. The polyurethane constituent components are the components serving as raw materials except the epoxy resin (a), that is, the polyol compound (b), the polyisocyanate compound (c), and the low molecular weight polyol compound (d), and the weight concentration of the polyurethane constituent components refers to the total weight concentration of the constituent components.

A compound represented by any one of the following formulae (2) to (11) may be used as the medium to high molecular weight polyol compound (b), a compound represented by the following formula (12) may be used as the polyisocyanate compound (c), and a compound represented by the following formula (13) may be used as the low molecular weight polyol compound (d), in which one kind of the respective components (b), (c), and (d) may be used alone, or two or more kinds thereof may be used in combination:

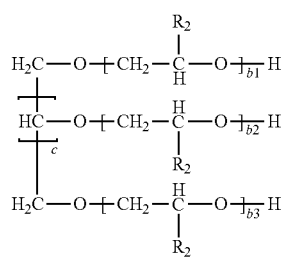

(2)

where $R_2$ represents H or a methyl group, and b1, b2, and b3 each independently represent a number of from 1 to 50, and "c" represents a number of 0 or 1;

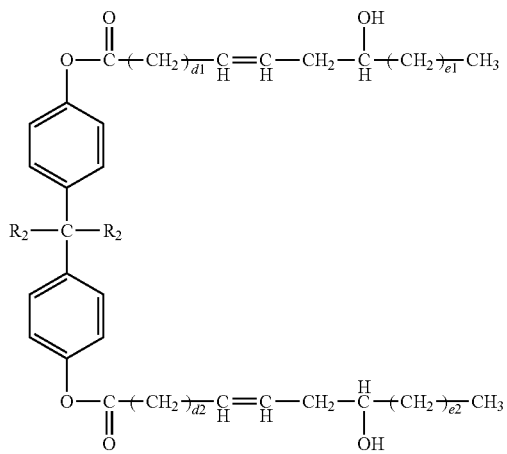

(3)

where $R_2$ represents H or a methyl group, and d1, d2, e1, and e2 each independently represent a number of from 1 to 20;

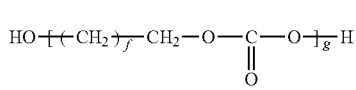

(4)

where "f"s each independently represent a number of from 1 to 20, and "g" represents a number of from 1 to 50;

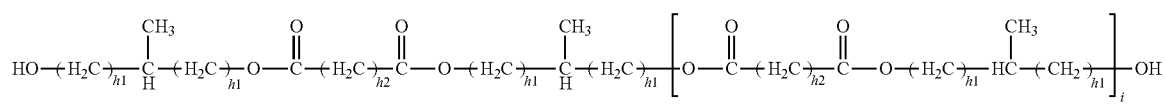

(5)

where h1 and h2 each independently represent a number of from 1 to 20, and "i" represents a number of from 1 to 50;

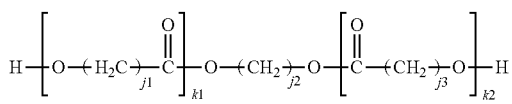

(6)

where j1, j2, and j3 each independently represent a number of from 1 to 20, and k1 and k2 each independently represent a number of from 1 to 50;

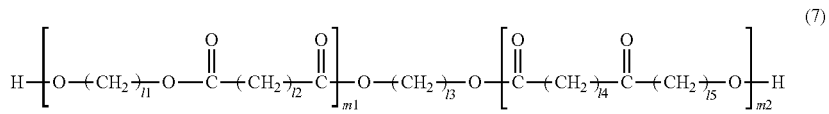
(7)

where l1, l2, l3, l4, and l5 each independently represent a number of from 1 to 20, and m1 and m2 each independently represent a number of from 1 to 50;

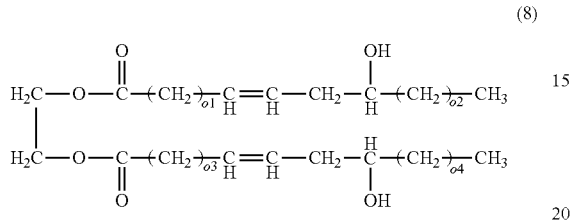
(8)

where o1, o2, o3, and o4 each independently represent a number of from 1 to 20;

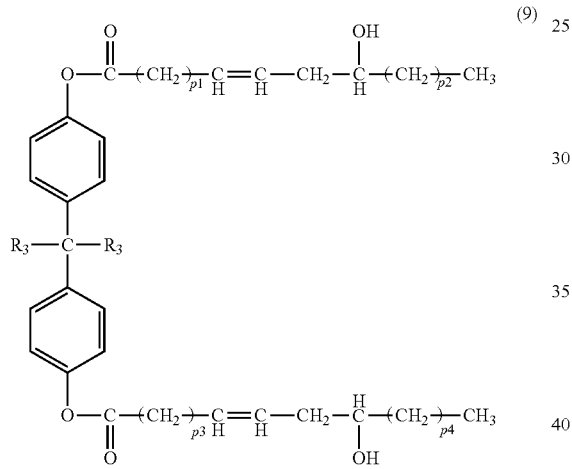
(9)

where $R_3$ represents H or a methyl group, and p1, p2, p3, and p4 each independently represent a number of from 1 to 20;

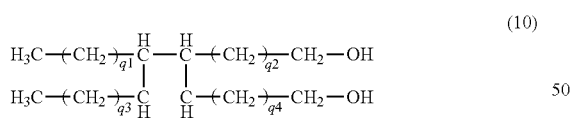
(10)

where q1, q2, q3, and q4 each independently represent a number of from 1 to 20;

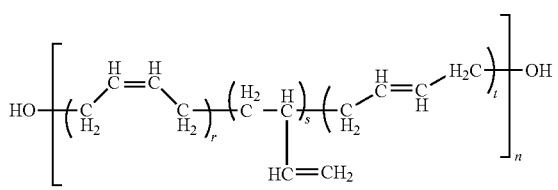
(11)

where "r", "s", and "t" each independently represent a number of from 1 to 20, and "n" represents a number of from 1 to 50;

(12)

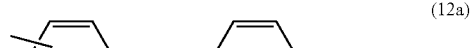
(12a)

(12b)

(12c)

(12d)

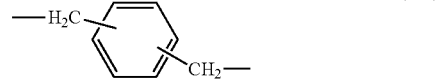

(12e)

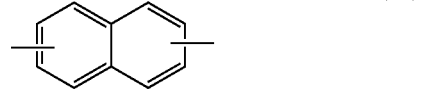
(12f)

in the formula 12, $R_4$ represents a divalent group selected from the formulae 12a to 12f;

(13)

(13a)

in the formula 13, $R_5$ represents an alkylene group represented by the formula 13a, and "g" represents a number of from 1 to 10.

It is particularly preferred that the epoxy resin (a) be a bisphenol A-type epoxy resin represented by the following formula (14) or a bisphenol F-type epoxy resin represented by the following formula (15), the medium to high molecular weight polyol compound (b) be a polypropylene glycol represented by the following formula (16), the low molecular weight polyol compound (d) be 1,4-butanediol represented by the following formula (17), and the polyisocyanate compound (c) be 4,4'-diphenylmethane diisocyanate represented by the following formula (18):

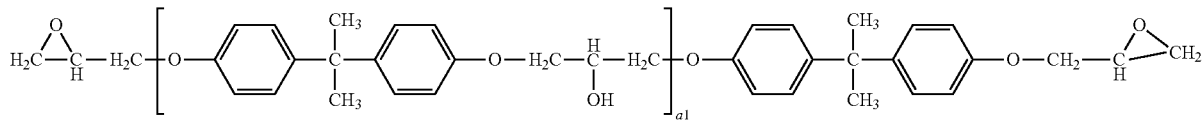
(14)

where a1 represents a number of from 0 to 10;

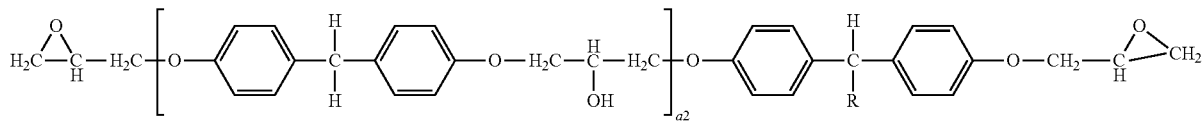
(15)

where a2 represents a number of from 0 to 10;

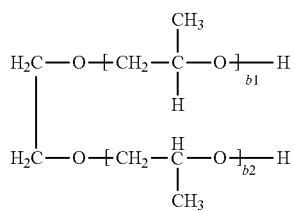
(16)

where b1 and b2 each independently represent a number of from 1 to 50.

(17)

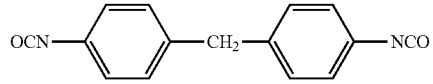
(18)

The epoxy resin (a) serving as a raw material for the low-concentration polyurethane-modified epoxy resin (A) is preferably a secondary hydroxyl group-containing bisphenol-based epoxy resin represented by the formula (1), and having an epoxy equivalent of from 150 g/eq to 200 g/eq and a hydroxyl equivalent of from 2,000 g/eq to 2,600 g/eq. In the formula (1), $R_1$ represents a hydrogen atom or a methyl group. The epoxy resin (a) is particularly preferably the bisphenol A-type epoxy resin represented by the formula (14) or the bisphenol F-type epoxy resin represented by the formula (15).

In the formula, "a" represents a number of from 0 to 10. When the resin has a molecular weight distribution, the average (number average) of the "a"s only needs to satisfy the range. The "a" is defined so as to satisfy the epoxy equivalent and the hydroxyl equivalent.

The medium to high molecular weight polyol compound (b) has a number-average molecular weight of 200 or more, and has any one of the molecular structures represented by the formula (2) to the formula (11). The polyol compound (b) is preferably the polypropylene glycol represented by the formula (16).

The polyisocyanate compound (c) is represented by the formula (12). In the formula, $R_4$ represents a divalent group selected from the formulae (12a) to (12f). A preferred polyisocyanate compound is represented by the formula (18).

The low molecular weight polyol compound (d) is a polyol compound represented by the formula (13) and having a number-average molecular weight of less than 200. The compound is used as a chain extender. In the formula, $R_5$ represents an alkylene group represented by the formula (13a) and "g" represents a number (integer) of from 1 to 10.

A OH group in the epoxy resin (a) is a secondary OH group incorporated mainly into an epoxy resin having a polymerization degree of 1 (referred to as "n=1 body"). When the resin contains an epoxy resin having a polymerization degree of 2 or more (referred to as "n>1 body"), a secondary OH group is also incorporated into the epoxy resin, and the group is similarly treated. The n=1 body and the n>1 body are hereinafter collectively referred to as "n=1 or more bodies."

Meanwhile, a OH group of the polyol compound (b) is a primary OH group, and hence when the epoxy resin (a), the polyol compound (b), and the polyisocyanate compound (c) are loaded and caused to react with one another, a primary OH group of the polyol compound (b) and an NCO group of the polyisocyanate compound (c) preferentially react with each other.

When a molar ratio "(b):(c)" between the primary OH groups in the polyol compound (b) and the NCO groups in the polyisocyanate compound (c) is set to fall within the range of from 1:3 to 1:20, an NCO group-terminated urethane prepolymer (P1) having a low molecular weight is produced. After that, a secondary OH group of the n=1 or more bodies in the epoxy resin (a) reacts with part of the terminal NCO groups of the urethane prepolymer (P1) to form a urethane bond, and hence a urethane prepolymer (P2) in which the n=1 or more bodies in the epoxy resin (a) are added to each of both terminals, or one terminal, of the urethane prepolymer may be obtained.

That is, a urethane prepolymer (P) may be a mixture of the NCO group-terminated urethane prepolymer (P1) and the urethane prepolymer (P2) in which the n=1 or more bodies in the epoxy resin (a) are added to each of both terminals, or one terminal, of the (P1). However, the molar ratio of an NCO group is large, and the epoxy resin is used in a large excess. Accordingly, the urethane prepolymer (P2) in which the epoxy resin is added to each of both the terminals may be mainly produced.

As the loading ratio of the epoxy resin (a) is increased, both the terminals are each, or one of the terminals is, sealed with the n=1 or more bodies in the epoxy resin (a), and hence the terminal NCO groups are consumed. Then, the amount of the urethane prepolymer (P2) that does not react with the low molecular weight polyol compound (d) serving as a chain extender increases. In addition, the ratio of the original urethane prepolymer (P1) whose terminals are NCO groups reduces, and hence the production amount of a polyurethane produced by a reaction between a terminal NCO group of the (P1) and a OH group of the low molecular weight polyol compound (d) serving as a chain extender reduces. Accordingly, the molecular weight distribution of the polyurethane-modified epoxy resin may shift to lower molecular weights.

In contrast, when the loading ratio of the epoxy resin (a) is reduced, the amount of the urethane prepolymer (P2) sealed with the n=1 or more bodies in the epoxy resin (a) at each of both terminals thereof or one terminal thereof reduces, and hence the ratio of the original urethane prepolymer (P1) still having NCO groups at terminals thereof increases. Accordingly, the production amount of the polyurethane produced by a reaction between a terminal NCO group of the P1 and a OH group of the low molecular weight polyol compound (d) serving as a chain extender increases, and hence the molecular weight distribution of the polyurethane-modified epoxy resin may shift to higher molecular weights.

The epoxy resin (a) is preferably liquid at normal temperature, and from such viewpoint, its epoxy equivalent is preferably 200 g/eq or less. The epoxy resin (a) is often a mixture of a monomer having a number n of repetitions of 0 and a multimer having a number n of repetitions of 1 or more, but when the resin contains a multimer, the resin has a secondary OH group produced by the ring-opening of an epoxy group. The OH group is reactive with an NCO group of the polyisocyanate compound (c) or a terminal NCO group of the urethane prepolymer (P), and hence the n=1 or more bodies in the epoxy resin (a) react therewith. An n=0 body free of any OH group is not involved in the reaction.

The polyol compound (b) and the polyisocyanate compound (c) are caused to react with each other while a loading ratio between the compounds is set so that the molar ratio "(b):(c)" between their OH groups and NCO groups falls within the range of from 1:3 to 1:20. However, when both the polyol compound (b) and the polyisocyanate compound (c) are bifunctional, the molar ratio coincides with a molar ratio between the polyol compound (b) and the polyisocyanate compound (c). When the loading molar ratio between the compounds (b) and (c) is set so that the polyisocyanate compound (c) is in a large excess as described in the foregoing, a larger amount of a urethane prepolymer having isocyanate groups at both terminals thereof can be obtained. As the molar ratio reduces to be closer to 1.0, the molecular weight of the urethane prepolymer to be produced excessively increases, and hence its viscosity becomes excessively high. In addition, a urethane polymer having an isocyanate group at one terminal thereof, or a urethane polymer having a OH group at a terminal thereof is liable to be produced. Meanwhile, a case in which the molar ratio becomes excessively high is not preferred because of the following reason. The molecular weight of the urethane prepolymer to be produced becomes excessively small, and hence the compatibility thereof with a matrix resin becomes larger. Accordingly, a phase-separated structure becomes vague to cause a risk in that a modifying effect cannot be sufficiently exhibited. When the molar ratio of an NCO group is set to be in a large excess as described above, such a urethane prepolymer that both of its terminals are further modified is produced. Thus, the urethane prepolymer (P2) in which the n=1 or more bodies in the epoxy resin are further added to each of both the terminals is obtained. Accordingly, at the time of the curing of the epoxy resin, such urethane prepolymer (P2) is easily introduced into a crosslinked portion with reliability, and hence a small amount of the prepolymer may lead to an improvement in toughness of a cured product.

The molar ratio "(b):(c)" is more preferably from 1:4 to 1:10.

The polyol compound (b) is preferably a compound having a number-average molecular weight of from 1,500 to 5,000 and excellent in compatibility with the epoxy resin (a). Examples thereof may include polyethylene glycols and polypropylene glycols each obtained by subjecting a polyhydric alcohol, such as ethylene glycol or glycerin, to ring-opening polyaddition with ethylene oxide or propylene oxide. Of those, a polypropylene glycol represented by the formula (2) is preferred in terms of ease of availability, and a satisfactory balance between a price and characteristics. In addition, the number of the OH groups of the polyol compound (b), which only needs to be 2 or more, is preferably 2.

The polypropylene glycol is preferably a polypropylene glycol having a number-average molecular weight of from 1,500 to 5,000, preferably from 2,000 to 3,000 from the following viewpoints: the polypropylene glycol does not thicken or semi-solidify a polyurethane-modified epoxy resin composition; and satisfactory tackiness of the composition, satisfactory followability thereof to an adhesive surface, a satisfactory casting property thereof, and satisfactory impregnability thereof into a carbon fiber or a glass fiber are secured.

The compound represented by the formula (12) is used as the polyisocyanate compound (c), and in the formula (12), $R_4$ represents a divalent group selected from the formulae (12a) to (12f). In addition, the compound is preferably a compound excellent in compatibility with the epoxy resin (a).

Examples thereof may include toluene diisocyanate (TDI), 4,4'-diphenylmethane diisocyanate (MDI), xylylene diisocyanate (XDI), hydrogenated xylylene diisocyanate (HXDI), isophorone diisocyanate (IPDI), and naphthalene diisocyanate. Of those, MDI represented by the formula (12a) is preferred from the viewpoints of, for example, a low molecular weight, the absence of any thickening property, a low price, and a safety. The number of the NCO groups of the polyisocyanate compound (c), which only needs to be 2 or more, is preferably 2.

After the urethane prepolymer (P) has been obtained in the epoxy resin (a), the prepolymer is subjected to a polyurethanation reaction by loading the low molecular weight polyol compound (d) so that a molar ratio "(P):(d)" between the NCO groups in the urethane prepolymer (P) and the OH groups in the low molecular weight polyol compound (d) falls within the range of from 0.9:1 to 1:0.9. Thus, the polyurethane-modified epoxy resin of the present invention can be obtained.

The low molecular weight polyol compound (d) has a number-average molecular weight of less than 200, and specific examples thereof include polyhydric alcohols, such as 1,4-butanediol and 1,6-pentanediol. The compound is preferably a diol having two OH groups, and is more preferably 1,4-butanediol in terms of ease of availability, and a satisfactory balance between a price and characteristics. The low molecular weight polyol compound (d) is represented by the formula (13). In the formula, $R_5$ represents an alkylene group represented by the formula (13a) and "g" represents a number of from 1 to 10.

The low molecular weight polyol compound (d) is desirably used in such an amount that the number of moles of the terminal NCO groups of the urethane prepolymer (P) and the number of moles of the OH groups of the low molecular weight polyol compound (d) are substantially equal to each other. That is, the polyol compound (b) and the low molecular weight polyol compound (d) have OH groups, and the polyisocyanate compound (c) has NCO groups, and hence the number of moles of the OH groups of the (b) and the (d), and the number of moles of the NCO groups of the (c) are preferably made substantially equal to each other. A ratio between the numbers preferably falls within the range of from 0.9:1 to 1:0.9. As the ratio between the number of moles of the OH groups and the number of moles of the NCO groups is made closer to 1, the molecular weight of the polyurethane to be produced increases.

In a production method for the low-concentration polyurethane-modified epoxy resin (A) to be used in the present invention, the epoxy resin (a) is used in an amount of from 78 wt % to 92 wt % with respect to the total amount of the epoxy resin (a), the polyol compound (b) having a number-average molecular weight of 200 or more, the polyisocyanate compound (c), and the low molecular weight polyol compound (d) having a number-average molecular weight of less than 200 serving as a chain extender, and the polyol compound (b) and the polyisocyanate compound (c) are caused to react with each other in the presence of the epoxy resin (a) while the compounds are used in such amounts that the molar ratio "(b):(c)" between their OH groups and NCO groups falls within the range of from 1:3 to 1:20 (reaction 1). In the reaction 1, the reaction between the polyol compound (b) and the polyisocyanate compound (c) preferentially occurs to produce the urethane prepolymer (P1), and then a reaction between part of the urethane prepolymer (P1) and the epoxy resin (a) occurs to mainly produce the urethane prepolymer (P2) epoxidized at both terminals thereof. Thus, a mixture of the urethane prepolymer (P2) epoxidized at one terminal thereof, which is produced in a slight amount, and the urethane prepolymer (P1) still having NCO groups at both terminals thereof is obtained.

The reaction between the urethane prepolymer (P1) and the epoxy resin (a) is preferably performed at a reaction temperature in the range of from 80° C. to 150° C. for a reaction time in the range of from 1 hr to 5 hr because a low reactive secondary OH group of the n=1 or more bodies in the epoxy resin (a) needs to be caused to react with an NCO group to produce a urethane bond.

After that, the prepolymer is subjected to a polyurethanation reaction by adding the low molecular weight polyol compound (d) so that the molar ratio "(P):(d)" between the NCO groups in the urethane prepolymer (P) and the OH groups in the low molecular weight polyol compound (d) falls within the range of from 0.9:1 to 1:0.9 (reaction 2). An epoxy group of the n=0 body of the epoxy resin and a OH group of the polyol compound (d) do not react with each other because the OH group of the polyol compound (d) is an alcoholic OH group.

The reaction temperature of the reaction 2 is preferably set within the range of from 80° C. to 150° C., and the reaction temperature thereof is preferably set within the range of from 1 hr to 5 hr. However, the reaction may be performed under conditions milder than those of the reaction 1 because the reaction is a reaction between the NCO groups and the OH groups in the low molecular weight polyol compound (d).

In the course of the reactions (reactions 1 and 2), a catalyst may be used as required. The catalyst is used for the purpose of sufficiently completing the production of a urethane bond, and examples thereof may include amine compounds, such as ethylenediamine, and tin-based compounds.

In the reaction 2, the urethane prepolymer (P1) having an NCO group at each of both terminals thereof or one terminal thereof, which is present in a slight amount, reacts with the low molecular weight polyol compound (d), and hence the prepolymer is extended in chain length and polyurethanated. The urethane prepolymer (P2) having the n=1 or more bodies in the epoxy resin (a) added to each of both terminals thereof is present while remaining unreacted.

That is, the polyurethane-modified epoxy resin of the present invention is a mixture of a resin component having the n=1 or more bodies in the epoxy resin (a) added to each of both terminals of the urethane prepolymer (P), which serves as a main component, and a resin component having the n=1 or more bodies in the epoxy resin (a) added to one terminal of the urethane prepolymer (P), and having an NCO group at the other terminal, a resin component having NCO groups at both terminals of the urethane prepolymer (P), and the n=0 body component in the epoxy resin (a), which serve as trace components, and preferably has an epoxy equivalent in the range of from 180 g/eq to 1,000 g/eq and a viscosity at 120° C. in the range of from 0.1 Pa·s to 20 Pa·s.

A reaction formula at the time of the obtainment of the polyurethane-modified epoxy resin (A) to be used in the composition of the present invention is described below.

The following formula 19 schematically describes a urethane prepolymer step serving as the reaction 1. The bisphenol-based epoxy resin (a) formed mainly of an n=0 body and an n=1 body, the medium to high molecular weight polyol compound (b), and the polyisocyanate compound (c) are caused to react with one another to produce the urethane prepolymer (P). The following three kinds are produced as the urethane prepolymer (P): a urethane prepolymer (U) having NCO groups at both terminals thereof; a urethane prepolymer (T) which has an NCO group at one terminal thereof and in which an epoxy resin serving as the n=1 body having a secondary hydroxyl group is added to the other terminal thereof; and a urethane prepolymer (S) in which the epoxy resin serving as the n=1 body having a secondary hydroxyl group is added to each of both terminals thereof. However, the polyisocyanate compound (c) and the bisphenol-based epoxy resin (a) are each used in a large excess. Accordingly, the urethane prepolymer (S) in which the epoxy resin serving as the n=1 body having a secondary hydroxyl group is added to each of both terminals thereof may be a main product, and the urethane prepolymer (T) which has an NCO group at one terminal thereof and in which the epoxy resin serving as the n=1 body having a secondary hydroxyl group is added to the other terminal thereof, and the urethane prepolymer (U) having NCO groups at both terminals thereof may each be produced in an extremely slight amount. In the epoxy resin (a), an epoxy resin serving as the n=0 body free of any secondary hydroxyl group is not involved in the reaction.

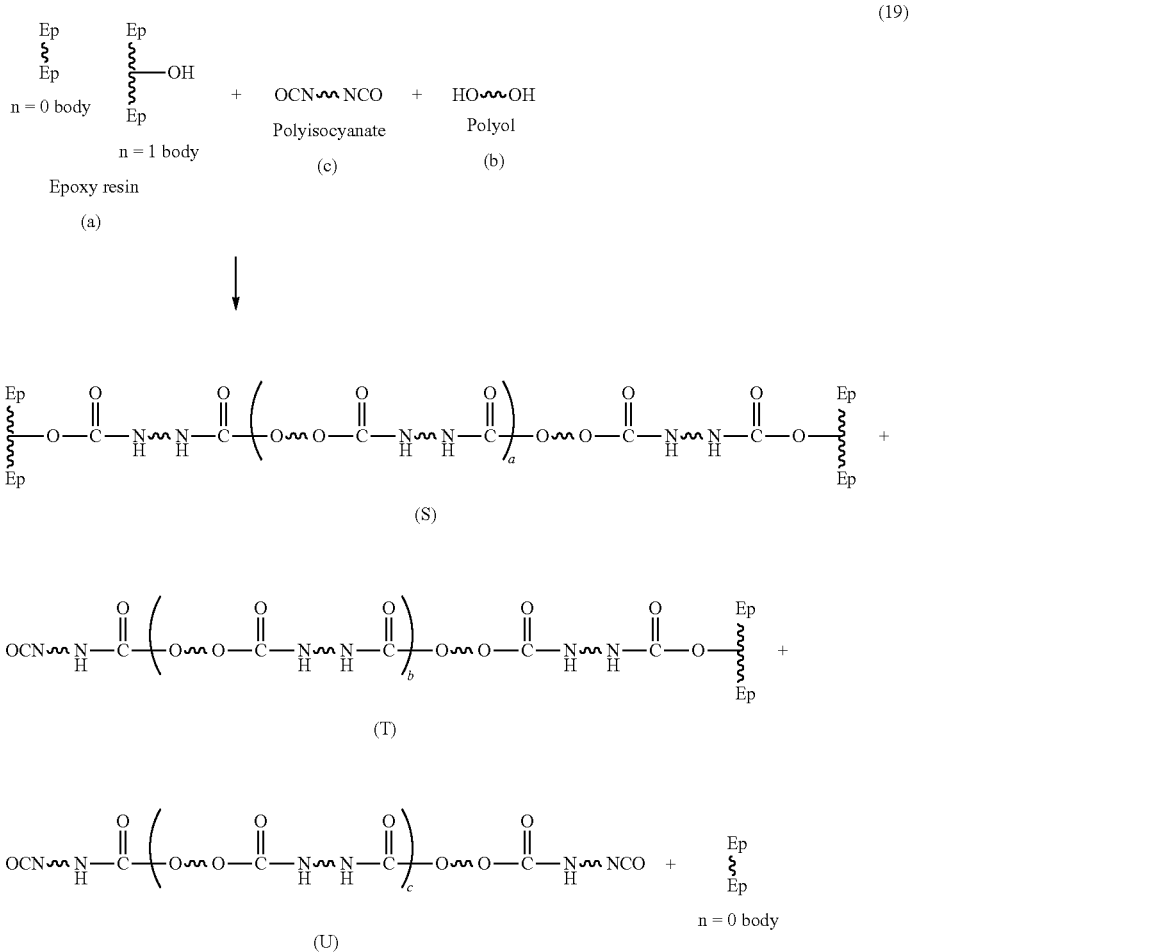

(19)

The following formula 20 schematically describes a urethane polymer step (polyurethane step) serving as the reaction 2. When a reaction is performed by adding the low molecular weight polyol (d) to a mixture of the urethane prepolymer (U) having NCO groups at both terminals thereof, the urethane prepolymer (T) having an NCO group at one terminal thereof and having the epoxy resin serving as the n=1 body added to the other terminal thereof, and the urethane prepolymer (S) having the epoxy resin serving as the n=1 body added to each of both terminals thereof, the prepolymers being produced in the reaction 1, and the epoxy resin serving as the n=0 body that has not been involved in the reaction because of the absence of any secondary hydroxyl group, the component (T) produced in a trace amount and the component (U) present in an extremely trace amount react with each other to produce compounds (V) and (W), but their amounts are trace. The component (S) remains unchanged and is not involved in the reaction, and hence turns into the component (A). Thus, as a whole, the low molecular weight polyurethane (A) having epoxy resins added to its terminals may be mainly produced.

Thus, substantially all the polyurethanes become a mixture of the urethane prepolymer (S) having the epoxy resin serving as the n=1 body added to each of both terminals thereof, the low molecular weight urethane polymer (A) similarly having the epoxy resin serving as the n=1 body added to each of both terminals thereof, and the epoxy resin serving as the n=0 body, and hence the polyurethanes in which substantially all urethanes are modified with epoxy resins may be produced.

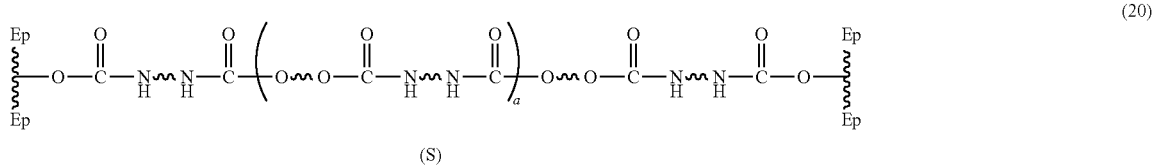

(20)

-continued

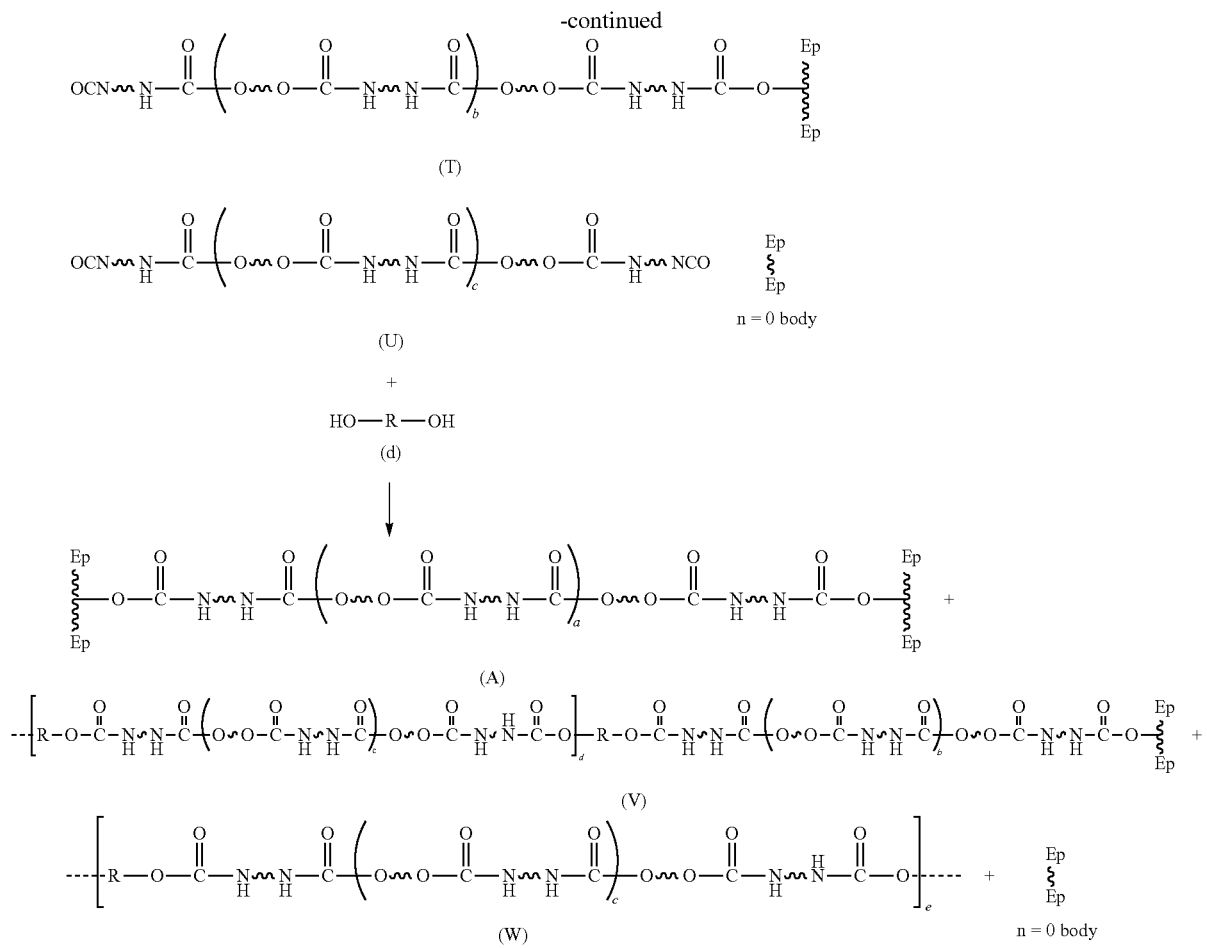

The epoxy resin composition of the present invention is obtained by blending the above-mentioned polyurethane-modified epoxy resin (A) with the polyurethane-unmodified liquid epoxy resin (B) serving as an adjustor for a polyurethane concentration, at least one kind of the bisphenol-type epoxy resin (C) serving as an adjustor for compatibility or a viscosity, or to improve tackiness in the state of a resin sheet or a prepreg, the resin being selected from the group consisting of a bisphenol A-type epoxy resin and a bisphenol F-type epoxy resin each having a glass transition temperature or a melting point of 50° C. or more, and the amine-based curing agent (D).

The resin composition of the present invention may be blended with a curing accelerator (E) and an inorganic filler serving as an extending agent or a reinforcing material, such as calcium carbonate, talc, or titanium dioxide, as required.

Although the polyurethane-unmodified liquid epoxy resin (B) is not particularly limited as long as the resin is an epoxy resin that is liquid at normal temperature, a bisphenol A-type epoxy resin or a bisphenol F-type epoxy resin is preferred in terms of ease of availability, and a satisfactory balance between a price and characteristics.

A polyurethane concentration in a cured product of the polyurethane-modified epoxy resin composition may be increased or reduced by increasing or reducing the blending amount of the polyurethane-unmodified liquid epoxy resin (B). Herein, the polyurethane concentration represents the wt % of the polyol (b), the polyisocyanate (c), and the low molecular weight polyol (d) serving as polyurethane constituent components in the cured product.

That is, the concentration is calculated from the following equation.

Polyurethane concentration=$\{(b)+(c)+(d)\}\times 100/\{(a)+(b)+(c)+(d)+(B)+(C)+(D)\}$ In the equation, the symbols (a) to (d), (B), (C), and (D) represent the used weights of the respective corresponding essential components. When any other component, such as the curing accelerator (E), is blended in addition to the essential components, the other component is added to the denominator.

As the polyurethane concentration in the cured product increases, cured product characteristics, such as a bending strain, impact strength, and a glass transition temperature, vary. As the polyurethane concentration increases, the bending strain of the cured product tends to increase, the impact strength thereof tends to increase, and the glass transition temperature thereof tends to reduce.

When a liquid bisphenol A-type epoxy resin is used as the polyurethane-unmodified liquid epoxy resin (B), a polyurethane modification ratio (=polyurethane concentration) in the cured product is preferably set within the range of from 1 wt % to 15 wt %. Thus, the cured product shows an Izod impact value (unnotched) of 30 kJ/m² or more measured in accordance with JIS K 7110, and a glass transition temperature of 110° C. or more, and hence excellent impact characteristics can be expressed. When a polyfunctional epoxy resin is used, the crosslink density of the cured product increases to change the phase-separated state thereof or to lose the fracture toughness thereof. Accordingly, the use of a polyfunctional epoxy resin that is trifunctional or more is preferably refrained to the extent possible. When such resin is used for increasing the Tg, its content is preferably set to from 0.1 wt % to 10 wt % with respect to the total weight of the composition. Examples of the polyfunctional epoxy resin that is trifunctional or more include: a glycidylamine-type epoxy resin, such as a phenol novolac-type epoxy resin, a cresol novolac-type epoxy resin, or tetraglycidyl diaminodiphenylmethane; a glycidyl phenyl ether-type epoxy resin, such as tetrakis(glycidyloxyphenyl)ethane or tris(glycidyloxyphenyl)methane; and an epoxy resin that is of a glycidylamine type and a glycidyl phenyl ether type, such as triglycidylaminophenol. The examples further include epoxy resins obtained by modifying those epoxy resins and brominated epoxy resins obtained by brominating those epoxy resins.

The epoxy resin composition of the present invention includes the unmodified solid epoxy resin (C) having the bisphenol structure, the resin having a glass transition temperature or a melting point of 50° C. or more.

Although any resin having a glass transition temperature or a melting point of 50° C. or more may be used as such unmodified solid epoxy resin (C), for example, a bisphenol-type epoxy resin of a high molecular weight type is useful, and examples thereof include: a bisphenol A-type epoxy resin, a bisphenol F-type epoxy resin, a biphenyl-type epoxy resin, a dicyclopentadiene-type epoxy resin, and epoxy resins obtained by modifying the resins; and phenoxy resins. As in the component (B), when a polyfunctional epoxy resin is used as the bisphenol-type epoxy resin (C), the crosslink density of the cured product increases to change the phase-separated state thereof or to lose the fracture toughness thereof. Accordingly, the use of a polyfunctional epoxy resin that is trifunctional or more is preferably refrained. When such resin is used for increasing the Tg, its content is preferably set to from 0.1 wt % to 10 wt % with respect to the total weight of the composition.

The epoxy resin composition of the present invention preferably includes the component (A) at from 3 wt % to 30 wt %, the component (B) at from 30 wt % to 70 wt %, and the component (C) at from 0.1 wt % to 40 wt % with respect to the total of the components (A) to (D).

When the content of the component (A) is 3 wt % or less, a sea-island structure is not beautifully formed, and hence sufficient collision strength may not be obtained. In addition, when the content is 30 wt % or more, such a structure that phase-separated states enter each other from the sea-island structure is obtained, and hence, similarly, sufficient collision strength may not be obtained. The component (C) is designed for appropriate adjustment of the viscosity of the composition for suppressing a resin flow at the time of its molding while maintaining the impregnability and fluidity of a resin. When the content of the component (C) is more than 40 wt %, the viscosity excessively increases, and hence an inconvenience may occur in dealing with the composition. It is more preferred that the content of the component (A) be from 4 wt % to 25 wt %, the content of the component (B) be from 35 wt % to 65 wt %, and the content of the component (C) be from 15 wt % to 40 wt %.

Dicyandiamide (DICY) or a derivative thereof is used as the curing agent (D) because DICY or a derivative thereof can be turned into a one-component liquid excellent in storage stability, and is easily available.

The blending amount of the curing agent (D) is preferably as follows in terms of cured product characteristics: when the curing agent is DICY, a ratio between the number of moles of the epoxy groups of all the epoxy resins including the polyurethane-modified epoxy resin and the polyurethane-unmodified epoxy resin (B), and the number of moles of the active hydrogen groups of DICY is set within the range of from 1:0.3 to 1:1.2, preferably from 1:0.9 to 1:1.1.

The epoxy resin composition of the present invention may further include the curing accelerator (E). A crystalline imidazole compound, such as 2,4-diamino-6-[2'-methylimidazolyl-(1')]-ethyl-s-triazine isocyanuric acid addition salt (2MA-OK), or a urea compound, such as 3-(3,4-dichlorophenyl)-1,1-dimethylurea (DCMU), may be used as the curing accelerator (E). The blending amount of the curing accelerator (E) preferably falls within the range of from 0.1 wt % to 5 wt % with respect to the total of all the epoxy resins including the polyurethane-modified epoxy resin and the polyurethane-unmodified liquid epoxy resin (B), and the curing agent (D).

The epoxy resin composition of the present invention does not inhibit tackiness, followability to an adhesive surface, and processability, such as a casting property into a mold, or impregnability into each of a carbon fiber and a glass fiber, and fabrics thereof.

The cured product of the epoxy resin composition of the present invention may be obtained by: heating the epoxy resin composition to a temperature of from 80° C. to 200° C. after the composition has been cast into a mold, after the composition has been applied and attached as an adhesive to an adherend, after the composition has been applied as a coating to a product to be coated, or after any one of a carbon fiber and a glass fiber, and fabrics thereof has been impregnated with the composition; and holding the composition at the temperature for several hours.

The cured product of the epoxy resin composition of the present invention has an Izod impact value (unnotched) of 30 kJ/m$^2$ or more measured in accordance with JIS K 7110, and a glass transition temperature of 110° C. or more.

EXAMPLES

Next, the present invention is specifically described on the basis of Examples. Synthesis Example 1 to Synthesis Example 6 and Reference Example 1 to Reference Example 5 relate to polyurethane-modified epoxy resins, and Example 1 to Example 8 and Comparative Example 1 to Comparative Example 5 relate to compositions and cured products thereof. The present invention is not limited by the specific examples, and various changes and modifications may be performed as long as the changes and modifications do not deviate from the gist of the present invention.

Methods of evaluating characteristics described in Examples are as described below.

(1) Judgment of Presence or Absence of Remaining NCO Group through IR: 0.05 g of the resultant polyurethane-modified epoxy resin was dissolved in 10 ml of tetrahydrofuran. After that, the solution was applied onto a KBr plate with a micro-spatula flat plate portion, and was dried at room temperature for 15 min so that tetrahydrofuran was evaporated. Thus, a sample for IR measurement was prepared. The sample was set in a FT-IR apparatus "Spectrum-One" manufactured by PerkinElmer Co., Ltd., and when a stretching vibration absorption spectrum at 2,270 cm$^{-1}$ serving as the characteristic absorption band of an NCO group disappeared, it was judged that no remaining NCO group was present.

(2) Epoxy Equivalent: Determination was performed in accordance with JIS K 7236.

(3) Hydroxyl Equivalent: 25 ml of dimethylformamide was loaded into a 200-milliliter Erlenmeyer flask with a glass plug, and a sample containing 11 mg/eq or less of a hydroxyl group was precisely weighed and added to dimethylformamide to be dissolved therein. 20 ml of a 1 mol/l solution of phenyl isocyanate in toluene and 1 ml of a solution of dibutyltin maleate were each added to the solution with a pipette, and the contents were shaken well to be mixed. The flask was tightly sealed and the mixture was subjected to a reaction for from 30 min to 60 min. After the completion of the reaction, 20 ml of a 2 mol/l solution of dibutylamine in toluene was added to the resultant, and the contents were shaken well to be mixed. The mixture was left to stand for 15 min and caused to react with excess phenyl isocyanate. Next, 30 ml of methyl cellosolve and 0.5 ml of a bromcresol green indicator were added to the resultant, and an excess amine was titrated with a 1 mol/l solution of perchloric acid in methyl cellosolve that had already been standardized. The color of the indicator changed from a blue color to a green color and then to a yellow color, and hence the first point at which the color became a yellow color was defined as an end point, and a hydroxyl equivalent was determined by using the following equation i and equation ii.

$$\text{Hydroxyl equivalent(g/eq)} = (1{,}000 \times W)/C(S-B) \quad (i)$$

C: concentration of 1 mol/l solution of perchloric acid in methyl cellosolve (mol/1)
W: amount of sample (g)
S: titration amount of 1 mol/l solution of perchloric acid in methyl cellosolve required for titration of a sample (ml)
B: titration amount of 1 mol/l solution of perchloric acid in methyl cellosolve required for blank test during titration (ml)

$$C = (1{,}000 \times w)/\{121 \times (s-b)\} \quad (ii)$$

w: collection amount of tris-(hydroxymethyl)-aminomethane weighed for standardization (g)
s: titration amount of 1 mol/l solution of perchloric acid in methyl cellosolve required for titration of tris-(hydroxymethyl)-aminomethane (ml)
b: titration amount of 1 mol/l solution of perchloric acid in methyl cellosolve required for blank test during standardization (ml)

(4) Viscosity: The viscosity of a resin composition before its curing at 40° C. was measured with an E-type viscometer.

(5) Glass Transition Temperature (Tg): The glass transition temperature (Tg) of a cured product test piece was derived from the peak temperature of its tan δ curve measured with a dynamic viscoelasticity-measuring apparatus under the condition of a rate of temperature increase of 2° C./min.

(6) Bending Test: A cured product molded into the shape of JIS K 6911 by mold casting was used as a test piece, and its bending strength, bending strain, and bending modulus were each measured by performing a bending test with a universal tester under a room temperature of 23° C. and under the condition of a crosshead speed of 1 mm/min.

(7) Izod Impact Strength: Measurement was performed in accordance with the Izod test method of JIS K 7110 under a room temperature of 23° C. without a notch.

(8) Tackiness: A resin composition before its curing was melted at from 60° C. to 80° C., and was applied onto a base material, such as release paper, with a bar coater so as to have a thickness of 100 g/m². A polyethylene film having a thickness of 40 μm was brought into close contact as a cover material with the composition, and the tackiness of the composition was judged on the basis of whether or not the cover material could be peeled at 25° C. without any resin residue. A case in which the cover material was able to be peeled without any problem was indicated by Symbol "0", and a case in which a resin residue was observed on the peeled surface was indicated by Symbol "x".

The following raw materials were used.

Epoxy resin (a): Epotohto YDF-170 manufactured by Nippon Steel & Sumikin Chemical Co., Ltd., bisphenol F-type epoxy resin, epoxy equivalent=170 (g/eq), hydroxyl equivalent=2,489 (g/eq)

Polyol (b); ADEKA POLYETHER P-2000 manufactured by ADEKA Corporation, polypropylene glycol, average molecular weight: 2,000, hydroxyl equivalent: 1,020 g/eq Polyisocyanate (c); COSMONATE PH manufactured by Mitsui Chemicals, Inc., 4,4'-diphenylmethane diisocyanate Low molecular weight polyol (d); 1,4-butanediol (reagent)

Unmodified liquid epoxy resin (B): Epotohto YD-128 manufactured by Nippon Steel & Sumikin Chemical Co., Ltd., bisphenol A-type epoxy resin, epoxy equivalent=187 (g/eq)

Unmodified solid epoxy resin (C):
(Component C-1) A bisphenol A-type bifunctional solid epoxy resin (YD-017, manufactured by Nippon Steel & Sumikin Chemical Co., Ltd., solid at normal temperature)
(Component C-2) A phenoxy resin (YP-70, manufactured by Nippon Steel & Sumikin Chemical Co., Ltd., solid at normal temperature)

Curing agent (D): DICYANEX 1400F manufactured by Evonik, dicyandiamide

Curing accelerator (E): Crystalline imidazole manufactured by Shikoku Chemicals Corporation, Curezol 2MA-OK, 2,4-diamino-6-[2'-methylimidazolyl-(1')]-ethyl-s-triazine isocyanuric acid addition salt Synthesis Example 1

"Epotohto YD-170" serving as the epoxy resin (a) and "ADEKA POLYETHER P-2000" serving as the polyol (b) were each loaded in a weight shown in Table 1 into a 1,000-milliliter four-necked separable flask including a nitrogen-introducing tube, a stirring machine, and a temperature controller, and were stirred and mixed at room temperature for 15 min. Next, "COSMONATE PH" serving as the polyisocyanate (c) was loaded in a weight shown in Table 1 into the flask, and the mixture was subjected to a reaction at 120° C. for 2 hr (reaction 1: urethane prepolymer step). After that, 1,4-butanediol serving as the low molecular weight polyol (d) that was a chain extender was loaded in a weight shown in Table 1 into the flask, and the mixture was subjected to a reaction at 120° C. for 2 hr (reaction 2: polyurethane step) to provide a polyurethane-modified bisphenol F-type epoxy resin. In this case, the epoxy resin (a) was loaded so that its amount became 80 wt % with respect to 100 wt % of the product of the reaction 2. In addition, a molar ratio "(b):(c)" between OH groups and NCO groups was set to 1:3.30. The completion of the reactions was confirmed by the disappearance of the absorption spectrum of an NCO group through IR measurement. The resultant polyurethane-modified bisphenol F-type epoxy resin (resin 1) had an epoxy equivalent of 207 g/eq.

Synthesis Examples 2 to 6

Polyurethane-modified bisphenol F-type epoxy resins (resins 2 to 6) were each obtained by performing reactions in accordance with the same procedure as that of Synthesis Example 1 except that the raw material loading composition was changed as shown in Table 1.

Reference Example 1

A polyurethane-modified bisphenol F-type epoxy resin (resin C1) was obtained by performing reactions in accordance with the same procedure as that of Synthesis Example 1 except that the raw material loading composition was changed as shown in Table 1.

Reference Examples 2 to 5

Polyurethane-modified bisphenol F-type epoxy resins (resins C2 to C5) were each obtained by performing reactions in accordance with the same procedure as that of Synthesis Example 1 except that the raw material loading composition was changed as shown in Table 1.

In Table 1, a blending amount is represented in the unit of "g", and a value in ( ) is represented in the unit of "wt %". The row "Concentration of (a) (wt %)" shows the concentration of the epoxy resin (a) in each resin, the row "OH groups of (b):NCO groups of (c) (molar ratio)" shows a molar ratio between OH groups in the component (b) and NCO groups in the component (c), and the row "NCO groups of (a), (b), and (c):OH groups of (d) (molar ratio)" shows a molar ratio between NCO groups in the primary reaction products of the components (a), (b), and (c), and OH groups in the component (d).

Next, Examples of epoxy resin compositions and epoxy resin cured products using the polyurethane-modified epoxy resins (resins 1 to 6 and resins C1 to C5) obtained in Synthesis Examples 1 to 6 and Reference Examples 1 to 5 described above are described. Simultaneously, their results are collectively shown in Table 2.

Example 1

The polyurethane-modified bisphenol F-type epoxy resin (resin 1) obtained in Synthesis Example 1, which served as the low-concentration polyurethane-modified epoxy resin (A), Epotohto YD-128 serving as the polyurethane-unmodified liquid epoxy resin (B), YD-017 serving as the unmodified solid epoxy resin (C), dicyandiamide serving as the curing agent (D), and 2MA-OK serving as the curing accelerator (E) were each loaded in a blending amount shown in Table 2 into a 300-milliliter dedicated disposable cup, and were stirred and mixed with a vacuum planetary centrifugal mixer for a lab for 20 min while being subjected to vacuum defoaming. Thus, a liquid resin composition was obtained. In this case, a molar ratio between an epoxy group and dicyandiamide was set to 1:0.5, and 140 g of a polyurethane-modified bisphenol F-type epoxy resin composition having a polyurethane concentration in a cured product thereof of 10 wt % was prepared. The resultant liquid resin composition had a viscosity at 40° C. of 1,200 Pa·s. The resultant resin was melted at 80° C., and was applied onto release paper so as to have a thickness of 100 g/m². A polyethylene sheet having a thickness of 40 μm was brought into close contact as a cover material with the composition. After that, it was confirmed that the cover material was able to be peeled under an environment at 25° C. without any resin residue.

Next, the liquid resin composition was cast into a mold having a groove shape having the dimensions of a test piece

TABLE 1

| | Synthesis Example | | | | | | Reference Example 1 | Reference Example 2 | Reference Example 3 | Reference Example 4 | Reference Example 5 |
|---|---|---|---|---|---|---|---|---|---|---|---|
| | 1 | 2 | 3 | 4 | 5 | 6 | | | | | |
| Epoxy resin (a) | 640.0 (80.0) | 640.0 (80.0) | 639.9 (80.0) | 640.0 (80.0) | 688.0 (86.0) | 688.0 (86.0) | 480.0 (60.0) | 600.0 (75.0) | 688.0 (86.0) | 688.0 (86.0) | 720.0 (90.0) |
| Polyol (b) | 113.9 (14.2) | 101.9 (12.3) | 89.9 (11.2) | 77.6 (9.7) | 58.4 (7.3) | 47.2 (5.9) | 255.2 (31.9) | 144.8 (18.1) | 28.0 (3.5) | 0.0 (0) | 39.2 (4.9) |
| Polyisocyanate (c) | 46.1 (5.8) | 54.6 (6.8) | 63.0 (7.9) | 71.2 (8.9) | 50.4 (6.3) | 58.4 (7.3) | 62.4 (7.8) | 53.6 (6.7) | 72.0 (9.0) | 91.2 (11.4) | 40.8 (5.1) |
| Low molecular weight polyol (d) | 0.0 (0.0) | 3.6 (0.5) | 7.2 (0.9) | 10.4 (1.3) | 3.2 (0.4) | 6.4 (0.8) | 2.4 (0.3) | 1.6 (0.2) | 12 (1.5) | 20.8 (2.6) | 0.0 (0) |
| Total g (wt %) | 800 (100) | 800 (100) | 800 (100) | 800 (100) | 800 (100) | 800 (100) | 800 (100) | 800 (100) | 800 (100) | 800 (100) | 800 (100) |
| Concentration of (a) (wt %) | 80 | 80 | 80 | 80 | 86 | 86 | 60 | 75 | 86 | 86 | 90 |
| OH groups of (b):NCO groups of (c) (molar ratio) | 1:3.30 | 1:4.00 | 1:4.37 | 1:7.50 | 1:7.0 | 1:10.0 | 1:2.0 | 1:3. | 1:21.0 | 1:4,000 | 1:8.55 |
| NCO groups of (a), (b), and (c):OH groups of (d) (molar ratio) | 1:1 | 1:1 | 1:1 | 1:1 | 1:1 | 1:1 | 1:1 | 1:1 | 1:1 | 1:1 | 1:1 |
| Epoxy equivalent (g/eq.) | 207 | 209 | 207 | 206 | 194 | 194 | 279 | 221 | 193 | 192 | 185 | for the Izod impact test of JIS K 7110. A test piece for a bending test was produced by casting the composition into a mold or a silicone-made frame having dimensions measuring 100 mm long by 10 mm wide by 4 mm thick, and a test piece for a DMA test was produced by casting the composition into a mold or a silicone-made frame having dimensions measuring 100 mm long by 10 mm wide by 1 mm thick, and the test pieces were each used after having been cut into a size suitable for measurement. A casting property at this time was at such a level that the composition was able to be sufficiently cast with a margin. Next, a mold having cast thereinto the resin was loaded into a hot air oven, and was thermally cured at 130° C. for 50 min and then at 150° C. for 50 min to prepare an epoxy resin cured product test piece. Test results obtained by using the test pieces are shown in Table 2.

Examples 2 to 8

Such polyurethane-modified bisphenol F-type epoxy resin compositions that polyurethane concentrations in cured products thereof were changed were each prepared by the same procedure as that of Example 1 except that the blending composition of the low-concentration polyurethane-modified epoxy resin (A), the unmodified liquid epoxy resin (B), the unmodified solid epoxy resin (C), the curing agent (D), and the curing accelerator (E) was changed as shown in Table 2.

Next, the liquid resin compositions were each cast into a mold and thermally cured by the same procedure as that of Example 1 to prepare a test piece for a characteristic evaluation. The physical properties and test results of the resultant compositions are shown in Table 2.

Comparative Examples 1 to 5

Polyurethane-modified bisphenol F-type epoxy resin compositions were each prepared by the same procedure as that of Example 1 except that the blending composition of the low-concentration polyurethane-modified epoxy resin (A), the unmodified liquid epoxy resin (B), the unmodified solid epoxy resin (C), the curing agent (D), and the curing accelerator (E) was changed as shown in Table 2.

Next, the liquid resin compositions were each cast into a mold and thermally cured by the same procedure as that of Example 1 to prepare a test piece for a characteristic evaluation. The physical properties and test results of the resultant compositions are shown in Table 2.

In Table 2, a blending amount is represented in the unit of "g", and a value in ( ) is represented in the unit of "wt %". The row "Viscosity$_{40}$" shows the viscosity of a composition (before its curing) at 40° C.

The compositions of Examples 1 to 8 each containing the low-viscosity urethane-modified epoxy resin each achieved both of high heat resistance and high impact strength as compared to Comparative Examples 1 to 5.

TABLE 2

| | Example | | | | | | | | Comparative Example 1 | Comparative Example 2 | Comparative Example 3 | Comparative Example 4 | Comparative Example 5 |
|---|---|---|---|---|---|---|---|---|---|---|---|---|---|
| | 1 | 2 | 3 | 4 | 5 | 6 | 7 | 8 | | | | | |
| Kind of resin | 1 | 2 | 2 | 3 | 4 | 5 | 6 | 2 | C1 | C2 | C3 | C4 | C5 |
| Amount of resin | 13.0 (9.3) | 32.8 (23.4) | 6.5 (4.6) | 13.0 (9.3) | 13.0 (9.3) | 23.3 (16.6) | 23.3 (16.6) | 32.1 (23.0) | 23.2 (16.6) | 18.6 (13.3) | 23.4 (16.7) | 23.3 (16.7) | 23.3 (16.7) |
| YD-128 | 78.2 (55.9) | 52.4 (37.5) | 90.8 (64.8) | 78.2 (55.9) | 78.2 (55.9) | 67.9 (48.5) | 67.9 (48.5) | 79.7 (56.9) | 104.8 (74.9) | 108.4 (77.5) | 68.2 (48.7) | 79.8 (57.0) | 68.1 (48.7) |
| C-1 | 26.1 (18.6) | 32.8 (23.4) | 25.9 (18.5) | 26.1 (18.6) | 26.1 (18.6) | 26.1 (18.6) | 26.1 (18.6) | 12.9 (9.2) | 0 (0) | 0 (0) | 26.2 (18.7) | 23.3 (16.7) | 26.1 (18.7) |
| C-2 | 13.0 (9.3) | 13.1 (9.4) | 6.5 (4.6) | 13.0 (9.3) | 13.0 (9.3) | 13.0 (9.3) | 13.0 (9.3) | 6.2 (4.4) | 0 (0) | 0 (0) | 13.1 (9.3) | 9.1 (6.5) | 13.1 (9.3) |
| Dicyandiamide | 5.2 (3.7) | 4.8 (3.4) | 5.6 (4.0) | 5.2 (3.7) | 5.2 (3.7) | 5.3 (3.8) | 5.3 (3.8) | 6.2 (4.4) | 6.5 (4.6) | 7.0 (5.0) | 5.3 (3.8) | 5.4 (3.9) | 5.3 (3.8) |
| 2 MA-OK | 4.5 (3.2) | 4.1 (2.9) | 4.8 (3.2) | 4.5 (3.2) | 4.5 (3.2) | 4.5 (3.2) | 4.5 (3.2) | 5.3 (3.8) | 5.5 (3.9) | 6.0 (4.3) | 4.0 (2.8) | 4.1 (2.9) | 4.0 (2.9) |
| Total g (wt %) | 140 (100) | 140 (100) | 140 (100) | 140 (100) | 140 (100) | 140 (100) | 140 (100) | 140 (100) | 140 (100) | 140 (100) | 140 (100) | 140 (100) | 140 (100) |
| Polyurethane concentration (wt %) | 2 | 5 | 1 | 2 | 2 | 2.5 | 2.5 | 5 | 10 | 5 | 2.5 | 2.5 | 2.5 |
| Viscosity$_{40}$ (Pa · s) | 1,200 | 1,450 | 1,150 | 1,220 | 1,250 | 1,120 | 1,150 | 370 | 40 | 30 | 1,270 | 1,300 | 900 |
| Tg (° C.) | 120 | 112 | 121 | 118 | 119 | 130 | 133 | 114 | 108 | 126 | 129 | 132 | 112 |
| Bending strength (MPa) | 125 | 120 | 122 | 124 | 125 | 125 | 127 | 120 | 99 | 114 | 122 | 124 | 95 |
| Bending strain (%) | 12↑ | 12↑ | 12↑ | 12↑ | 12↑ | 12↑ | 12↑ | 12↑ | 8.9 | 12↑ | 12↑ | 12↑ | 7.5 |
| Bending modulus (GPa) | 2.8 | 2.7 | 2.9 | 2.8 | 2.8 | 2.8 | 2.8 | 2.6 | 2.4 | 2.7 | 2.8 | 2.8 | 2.4 |
| Izod impact strength (kJ · m$^{0.5}$) | 35.2 | 40.8 | 41.1 | 39.8 | 39.6 | 42.1 | 44.1 | 38.4 | 22.4 | 28.1 | 21.1 | 28.3 | 20.7 |
| Tackiness | ○ | ○ | ○ | ○ | ○ | ○ | ○ | ○ | x | x | ○ | ○ | ○ |

INDUSTRIAL APPLICABILITY

The epoxy resin composition of the present invention is suitable for, for example, adhesives, coating materials, electrical and electronic materials, and matrix resins for composite materials.

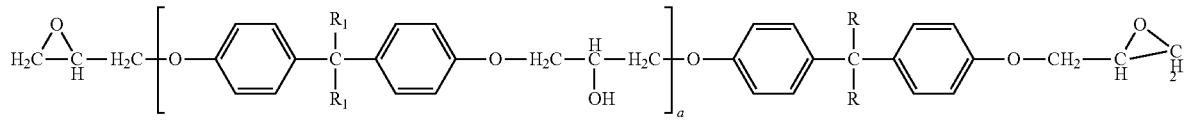

(1)

The invention claimed is:

1. An epoxy resin composition, comprising, as essential components, the following components (A) to (D):
   (A) a low-concentration polyurethane-modified epoxy resin, which contains a polyurethane having an epoxy resin added to each of both terminals thereof and/or one terminal thereof, and in which a weight concentration of polyurethane constituent components is from 1.0 wt % to 15.0 wt %;
   (B) a polyurethane-unmodified epoxy resin that is liquid at 30° C.;
   (C) a solid epoxy resin having a bisphenol structure, the resin having a glass transition temperature or a melting point of 50° C. or more; and
   (D) an amine-based curing agent that is dicyandiamide or a derivative thereof,
   wherein the epoxy resin composition comprises the component (A) at from 3.0 wt % to 30.0 wt %, and the component (C) at from 0.1 wt % to 40.0 wt % with respect to a total of the components (A) to (D).

2. The epoxy resin composition according to claim 1, wherein the epoxy resin composition has an initial viscosity of from 100 Pa·s to 2,000 Pa·s.

3. The epoxy resin composition according to claim 2, wherein the component (A) is a low-concentration polyurethane-modified epoxy resin, which is obtained by modifying a bisphenol-based epoxy resin (a) represented by the following formula (1) having an epoxy equivalent of from 150 g/eq to 200 g/eq and a hydroxyl equivalent of from 2,000 g/eq to 2,600 g/eq with a medium to high molecular weight polyol compound (b) having a number-average molecular weight of 200 or more, a polyisocyanate compound (c), and a low molecular weight polyol compound (d) having a number-average molecular weight of less than 200 serving as a chain extender,
the low-concentration polyurethane-modified epoxy resin comprising a polyurethane having the epoxy resin (a) added to each of both terminals thereof and/or one terminal thereof, the polyurethane being obtained by:
producing a urethane prepolymer (P) by using the epoxy resin (a) in an amount of from 78 wt % to 92 wt % with respect to a total amount of the components (a), (b), (c), and (d), and causing the medium to high molecular weight polyol compound (b) and the polyisocyanate compound (c) to react with each other in the presence of the epoxy resin (a) while using the compounds in such amounts that a molar ratio between OH groups of the component (b) and NCO groups of the component (c) falls within a range of from 1:3 to 1:20; and
then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) falls within a range of from 0.9:1 to 1:0.9:

where R and $R_1$ each represent H or a methyl group, and "a" represents a number of from 0 to 10.

4. An epoxy resin cured product, which is obtained by curing the epoxy resin composition of claim 3.

5. The epoxy resin cured product according to claim 4, wherein the epoxy resin cured product has a glass transition temperature (Tg) of 110° C. or more, and an Izod impact value (unnotched) of 30 $kJ/m^2$ or more measured in accordance with JIS K 7110.

6. An epoxy resin cured product, which is obtained by curing the epoxy resin composition of claim 2.

7. The epoxy resin cured product according to claim 6, wherein the epoxy resin cured product has a glass transition temperature (Tg) of 110° C. or more, and an Izod impact value (unnotched) of 30 $kJ/m^2$ or more measured in accordance with JIS K 7110.

8. The epoxy resin composition according to claim 1, wherein the component (A) is a low-concentration polyurethane-modified epoxy resin, which is obtained by modifying a bisphenol-based epoxy resin (a) represented by the following formula (1) having an epoxy equivalent of from 150 g/eq to 200 g/eq and a hydroxyl equivalent of from 2,000 g/eq to 2,600 g/eq with a medium to high molecular weight polyol compound (b) having a number-average molecular weight of 200 or more, a polyisocyanate compound (c), and a low molecular weight polyol compound (d) having a number-average molecular weight of less than 200 serving as a chain extender,
the low-concentration polyurethane-modified epoxy resin comprising a polyurethane having the epoxy resin (a) added to each of both terminals thereof and/or one terminal thereof, the polyurethane being obtained by:
producing a urethane prepolymer (P) by using the epoxy resin (a) in an amount of from 78 wt % to 92 wt % with respect to a total amount of the components (a), (b), (c), and (d), and causing the medium to high molecular weight polyol compound (b) and the polyisocyanate compound (c) to react with each other in the presence of the epoxy resin (a) while using the compounds in such amounts that a molar ratio between OH groups of the component (b) and NCO groups of the component (c) falls within a range of from 1:3 to 1:20; and
then subjecting the urethane prepolymer (P) to a polyurethanation reaction by adding the low molecular weight polyol compound (d) so that a molar ratio between NCO groups of the urethane prepolymer (P) and OH groups of the low molecular weight polyol compound (d) falls within a range of from 0.9:1 to 1:0.9:

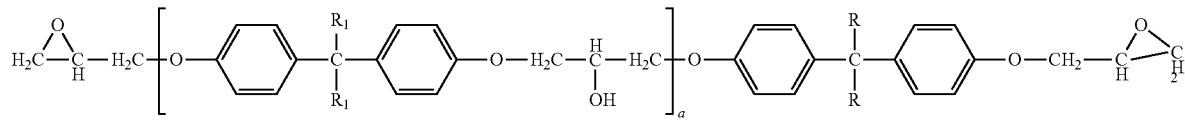

(1)

where R and R₁ each represent H or a methyl group, and "a" represents a number of from 0 to 10.

9. An epoxy resin cured product, which is obtained by curing the epoxy resin composition of claim 8.

10. The epoxy resin cured product according to claim 9, wherein the epoxy resin cured product has a glass transition temperature (Tg) of 110° C. or more, and an Izod impact value (unnotched) of 30 kJ/m² or more measured in accordance with JIS K 7110.

11. An epoxy resin cured product, which is obtained by curing the epoxy resin composition of claim 1.

12. The epoxy resin cured product according to claim 11, wherein the epoxy resin cured product has a glass transition temperature (Tg) of 110° C. or more, and an Izod impact value (unnotched) of 30 kJ/m² or more measured in accordance with JIS K 7110.

* * * * *